United States Patent
Kobayashi et al.

[11] Patent Number: 5,991,257
[45] Date of Patent: Nov. 23, 1999

[54] DISK WITH ZONES OF TRACKS SEGMENTED INTO DATA FRAMES, WITH TRACKS CLOSER TO THE DISK EDGE HAVING MORE FRAMES, AND A DATA RECORDING/REPRODUCING METHOD AND APPARATUS USING SUCH DISK

[75] Inventors: Shoei Kobayashi, Kanagawa; Tadaaki Nomoto, Tokyo; Shuji Uehara, Kanagawa, all of Japan

[73] Assignee: Sony Corporation, Tokyo, Japan

[21] Appl. No.: 08/979,372

[22] Filed: Nov. 26, 1997

Related U.S. Application Data

[62] Division of application No. 08/789,085, Jan. 27, 1997, Pat. No. 5,754,522.

[30] Foreign Application Priority Data

Feb. 2, 1996 [JP] Japan ................................. 8-017292

[51] Int. Cl.$^6$ ........................................................ G11B 7/24
[52] U.S. Cl. ........................................... 369/275.3; 369/48
[58] Field of Search ............................. 369/275.3, 275.2, 369/58, 47, 48, 54, 32, 275.4

[56] References Cited

U.S. PATENT DOCUMENTS

| | | |
|---|---|---|
| 5,339,302 | 8/1994 | Takahashi et al. ...................... 369/58 |
| 5,388,093 | 2/1995 | Yoshida et al. ......................... 369/124 |
| 5,506,823 | 4/1996 | Sanada ..................................... 369/48 |
| 5,587,901 | 12/1996 | Yamagami et al. .................. 369/275.3 |
| 5,590,097 | 12/1996 | Kashiwakura et al. ................... 369/13 |
| 5,696,752 | 12/1997 | Hajjar et al. ............................ 369/124 |
| 5,828,639 | 10/1998 | Kobayashi et al. .................. 369/275.3 |
| 5,835,461 | 11/1998 | Kobayashi et al. .................. 369/275.3 |
| 5,878,024 | 3/1999 | Kobayashi et al. .................. 369/275.3 |

*Primary Examiner*—Tan Dinh
*Attorney, Agent, or Firm*—Limbach & Limbach L.L.P.

[57] ABSTRACT

A disk to which sectors and clusters of data can be written, wherein each of the sectors includes an arbitrary first number of data frames and each of the clusters includes an arbitrary number of sectors, wherein the disk includes a region for recording the data, wherein the region is segmented into zones, a first set of at least one of the zones is located adjacent to a second set of at least one of the zones, the second set is located closer to an outer circumferential side of the disk than is the first set, each track of the first set is segmented into a second number of data frames, and each track of the second set is segmented into a third number of data frames, where the third number is the sum of the second number and a fourth number smaller than the first number. Other aspects of the invention are a method and apparatus for recording data to or reproducing data from such a disk.

3 Claims, 14 Drawing Sheets

Wobbled Data Frame Structure

DISK WITH ZONES OF TRACKS SEGMENTED INTO DATA FRAMES, WITH TRACKS CLOSER TO THE DISK EDGE HAVING MORE FRAMES, AND A DATA RECORDING/REPRODUCING METHOD AND APPARATUS USING SUCH DISK

This is a divisional of application Ser. No. 08/789,085, filed Jan. 27, 1997 and now is U.S. Pat. No. 5,754,522.

BACKGROUND OF THE INVENTION

The present invention generally relates to a disk, a disk forming method, a disk forming apparatus, a recording/reproducing method, and a recording/reproducing apparatus. More specifically, the present invention is directed to a pregrooved disk, a pregrooved disk forming method, a pregrooved disk forming apparatus, a recording/reproducing method with using a pregrooved disk, and a recording/reproducing apparatus with using a pregrooved disk, from which addresses can be readily detected, and onto/from which data can be recorded/reproduced in high density.

To record data on disks, address information should be previously recorded in such a manner that the data can be recorded on preselected positions of the disks. This address information may be recorded by wobbling a pregroove based on a frequency modulation wave obtained by frequency-modulating the address information.

This address information wobbling process is usually executed in an MD (mini disk: trade mark), and a CDR (recordable compact disk).

That is, in such a disk, when a track for recording data is previously formed as a pregroove, a side wall of this pregroove is wobbled in accordance with address information. Thus, an address can be read from the wobbling information (address information), so that data can be recorded on a desired position.

On the other hand, since the phase of the wobbling information (address data) is not coincident with the phase of the frequency modulation wave in the conventional disk, boundary portions of bits of address data can be hardly discriminated, so that the address data may be erroneously detected.

Also, since the wobbling information is recorded in very low density, compared with the recording/reproducing information, when data is recorded on a preselected sector on the basis of the wobbling information, the recording positions on the sectors are positionally shifted every time the data is recorded. There is interference occurred in the continuous sectors so as to the recording positions on the sectors. Further, a buffer area must be formed between the successive sectors, on which no data is essentially recorded, in order to absorb jitter caused by eccentricity. If the interference between the successive sectors is increased, then the size of this buffer area must be made large. As a result, such regions on which the data cannot be essentially recorded are increased. Eventually, the recording capacity of this disk would be lowered. As a consequence, there are such problems that the entire system would become very redundant, and the data can be hardly recorded/reproduced at random in high density.

Under such a circumstance, in order to increase a storage capacity of a disk, this disk is not manufactured as a CAV (constant angular velocity) type disk whose angular velocity is made constant, but may be manufactured as a CLV (constant linear velocity) type disk whose linear velocity is made constant. However, rapid access operation cannot be achieved in such a CLV disk, as compared with a CAV disk.

Accordingly, a zone CAV disk is known as an intermediate disk existing between a CAV disk and a CLV disk. In this zone CAV disk, a data recording region of the disk is segmented into a plurality of zones. This zone CAV disk is rotated whose angular velocity becomes constant. In the respective zones, one zone located on the outer circumference side owns a larger sector number per 1 track (1 rotation), as compared with a sector number per 1 track of another zone located on the inner circumference side. As a result, the recording density of the zone CAV disk can be increased, as compared with that of the CAV disk, and furthermore, rapid access operation can be achieved, as compared in the CLV disk.

However, very recently, there is a trend that an amount of codes used for correcting errors of data is increased in connection with data high density recording/reproducing techniques. As a result, even in such a zone CAV disk, it is rather difficult to secure a sufficiently large storage capacity.

OBJECTS AND SUMMARY OF THE INVENTION

The present invention has been made to solve the above-described problems, and therefore, can readily detect a clock and also can record/reproduce data in higher density.

To achieve the above-described object, a disk, according to an aspect of the present invention, is featured by that address data is biphase-modulated; channel bit data obtained by biphase-modulating the address data is frequency-modulating a pregroove is wobbled based upon a frequency modulation wave obtained by frequency-modulating the channel bit data; and a starting point and an end point of the channel bit are zero cross points of the frequency modulation wave.

Also, a disk forming apparatus, according to another aspect of the invention, is featured by comprising: biphase modulating means for biphase-modulating the address data; frequency modulating means for frequency-modulating channel bit data obtained by biphase-modulating address data by the biphase modulating means in such a manner that a starting point and an end point of the channel bit become zero cross points of a frequency modulation wave; and wobbling means for wobbling the pregroove based upon the frequency modulation wave obtained by frequency-modulating the channel bit data by the frequency modulating means.

A recording/reproducing apparatus, according to another aspect of the present invention, is featured by comprising: recording/reproducing means for recording/reproducing information with respect to the disk; extracting means for extracting the address data from a reproduction output of the recording/reproducing means; and control means for controlling a position of the recording/reproducing means on the disk in response to the data extracted from the extracting means.

Further, a disk, according to another aspect of the present invention, is featured by that: a region for recording the data is segmented into a plurality of zones; and in two sets of the zones located adjacent to each other, data frame number of the zone per 1 rotation provided on an outer circumferential side of the disk is set to a value larger than data frame number of the zone per 1 rotation provided on an inner circumferential side of the disk by another arbitrary integer (K), the integer (K) being smaller than the integer (F).

Also, a recording/reproducing apparatus, according to another aspect of the present invention, is featured by comprising: reading means for reading a track number of an access point of the disk; storing means for storing a table about the track number and a zone, in which the following relationship is established, i.e., in two sets of the zones located adjacent to each other, data frame number of the zone per 1 rotation provided on an outer circumferential side of the disk is set to a value larger than data frame number of the zone per 1 rotation provided on an inner circumferential side of the disk by another arbitrary integer (K), the integer (K) being smaller than the integer (F); judging means for judging the zone belonging to the track number read by the reading means with reference to the table of the storing means; and generating means for generating a clock having a predetermined frequency in response to a judgment result the judging means.

Also, a disk forming method, according to another aspect of the present invention, is featured by that: the address data is biphase-modulated; channel bit data obtained by biphase-modulating the address data is frequency-modulated in such a manner that a starting point and an end point of the channel bit constitute zero cross points of a frequency modulation wave; and the pregroove is wobbled based upon the frequency modulation wave obtained by frequency-modulating the channel bit data.

Then, a recording/reproducing method, according to a further aspect of the present invention, is featured by that: address data is extracted from the reproduction output of the disk; and an access point on the disk is controlled in response to the extracted address data.

Also, a recording/reproducing method, according to a still further aspect of the present invention, is featured by that: a track number of an access point of the disk is read; a table about the track number and a zone is stored in which the following relationship is established, i.e., in two sets of the zones located adjacent to each other, data frame number of the zone per 1 rotation provided on an outer circumferential side of the disk is set to a value larger than data frame number of the zone per 1 rotation provided on an inner circumferential side of the disk by another arbitrary integer (K), the integer (K) being smaller than the integer (F); the zone belonging to the track number read by the reading means is judged with reference to the table of the storing means; and a clock having a predetermined frequency is generated in response to a judgment result the judging means.

BRIEF DESCRIPTION OF THE DRAWINGS

The present invention may be understood from the detailed descriptions to be read in conjunction with the accompanying drawings, in which.

DESCRIPTION OF THE PREFERRED EMBODIMENTS

Figure 1:
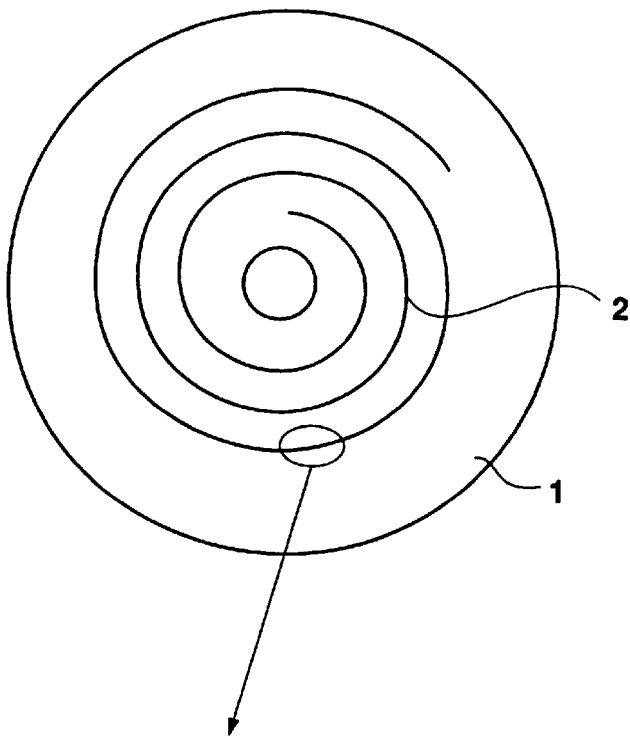
FIG. 1 is an explanatory diagram for explaining such a condition that a disk according to the present invention is wobbled.

FIG. 1 schematically shows a structural example of an optical disk to which a disk according to the present invention is applied. As shown in this drawing, a pregroove 2 is previously formed in a disk (optical disk) 1 in a spiral form from an inner circumference toward an outer circumference. Alternatively, this pregroove 2 may be, of course, formed in a coaxial form.

Figure 2:
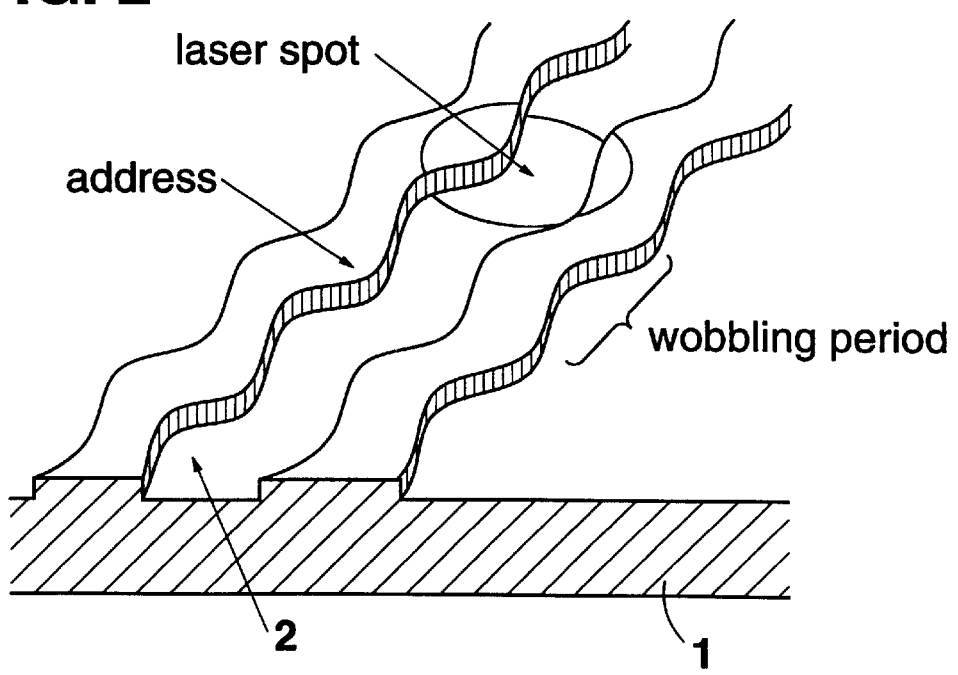
FIG. 2 illustrates a structural example of a wobbling address frame.

A portion of this pregroove 2 is indicated in an enlarge form in FIG. 2. Right/left side walls of this pregroove 2 are wobbled in correspondence with address information, and meandered in correspondence with a frequency modulated signal. A single track contains a plurality of wobbling address frames.

Figure 3:
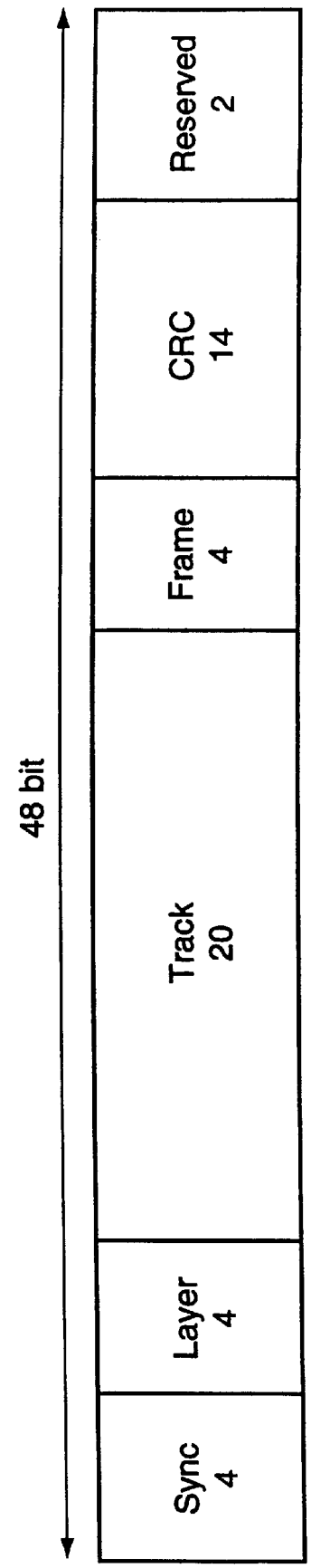
FIG. 3 represents a wobbled data frame structure.

FIG. 3 schematically represents a structure (format) of a wobbling address frame. As shown in FIG. 3, the wobbling address frame is arranged by 48 bits. First 4 bits of this wobbling address frame are used as a synchronization signal (Sync) indicative of a start of this wobbling address frame. The succeeding 4 bits are used as a layer (Layer) for indicating which layer among a plurality of recording layers. The next 20 bits are used as a track address (track number). Further, the next 4 bits are employed so as to indicate a frame number of an address frame. The succeeding 14 bits are used to express an error correction code (CRC), on which an error correction code excluding the synchronization signal (Sync) is recorded. The final 2 bits are saved as a future use.

As to a wobbling address frame, for instance, 8 frames are recorded per 1 track (1 rotation) in a CAV disk manner such that a rotation angular speed of a disk is constant. As a result, as the frame number of FIG. 3, for instance, values from "0" to "7" are recorded.

Figure 4:
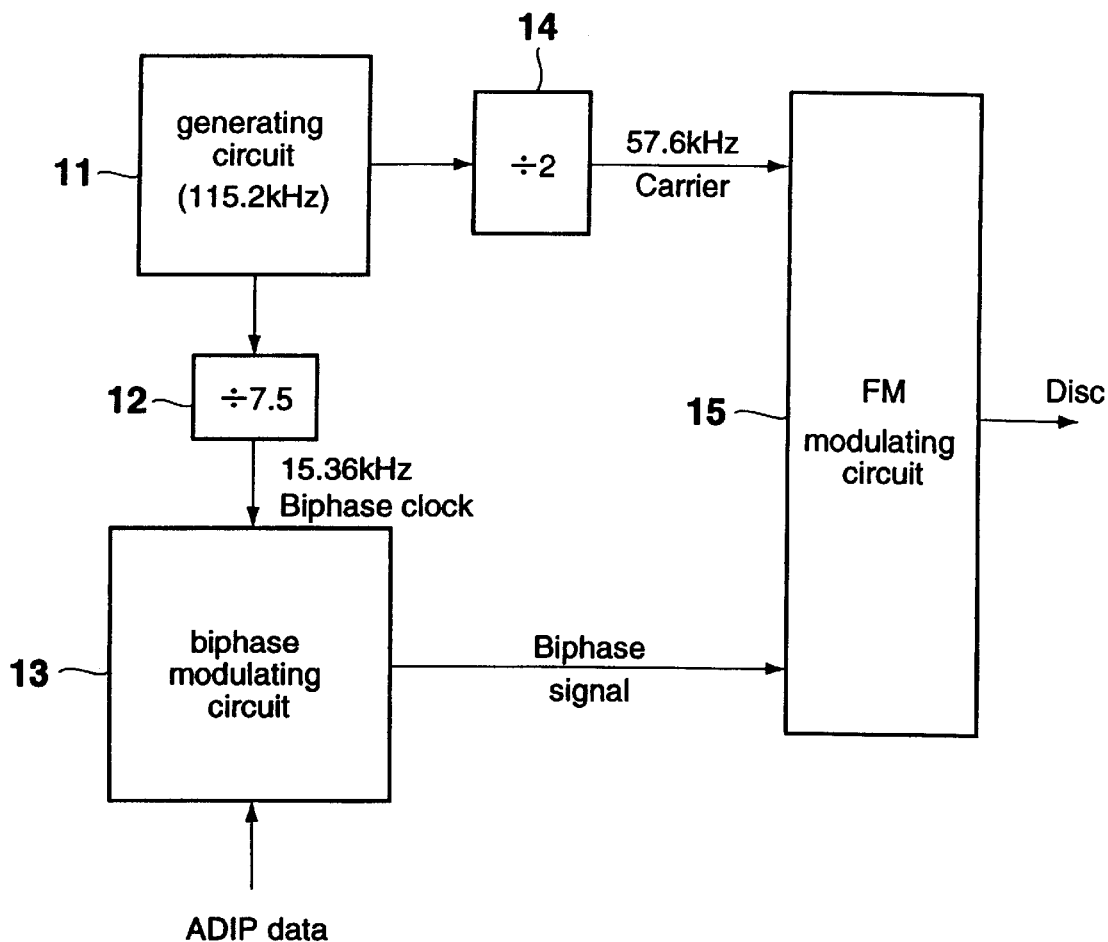
FIG. 4 is a schematic block diagram for showing a circuit arrangement of a wobbling signal generating circuit.

FIG. 4 schematically shows an internal arrangement of a wobbling signal generating circuit for generating a wobbling signal used to wobble the pregroove 2 in response to the address frame of the format indicated in FIG. 3. A generating circuit 11 of this wobbling signal generating circuit generates a signal having a frequency of 115.2 kHs. The signal generated from the generating circuit 11 is supplied to a dividing circuit 12 so as to be divided by a value of 7.5. The divided signal is supplied to a biphase modulating circuit 13 as a biphase clock signal having a frequency of 15.36 kHz. Also, ADIP (Address In Pre-groove) data equal to the frame format shown in FIG. 3 is supplied to this biphase modulating circuit 13.

The biphase modulating circuit 13 biphase-modulates the biphase clock supplied from the dividing circuit 12 based on the ADIP data (address data) supplied from a circuit (not shown), and then outputs a biphase signal to an FM modulating circuit 15. Also, to this FM modulating circuit 15, a carrier having a frequency of 57.6 kHz is inputted which is obtained by dividing the signal having the frequency of 115.2 kHz generated from the generating circuit 11 by a value of 2 by another dividing circuit 14. The FM modulating circuit 15 frequency-modulates the carrier entered from this dividing circuit 14 based upon the biphase signal entered from the biphase modulating circuit 13, and then outputs the resulting frequency modulation signal. The right/left side walls of the pregroove 2 of the disk 1 are formed (namely, wobbled) in response to this frequency modulation signal derived from the FM modulating circuit 15.

Figure 5:
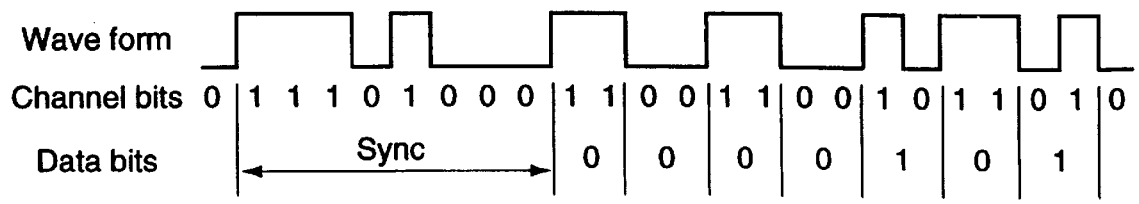
FIG. 5 shows one example of a biphase signal outputted from the biphase modulating circuit 13 employed in the wobbling signal generating circuit of FIG. 4.
Figure 6:
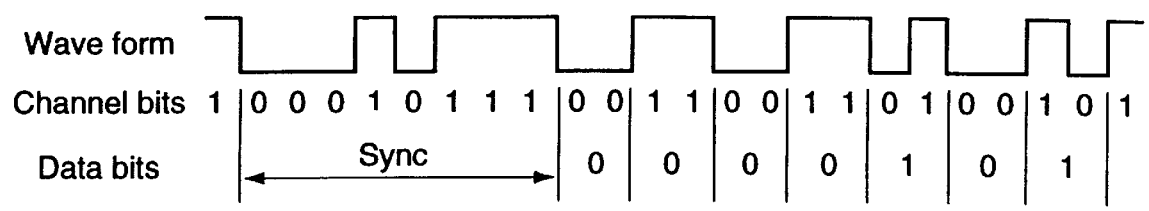
FIG. 6 indicates another example of a biphase signal outputted from the biphase modulating circuit 13 employed in the wobbling signal generating circuit of FIG. 4.

FIG. 5 and FIG. 6 represent an example of the biphase signal outputted from the biphase modulating circuit 13. In this embodiment, when the preceding bit is equal to "0", as shown in FIG. 5, "11101000" is employed as the sync pattern (Sync), whereas when the preceding bit is equal to "1", as indicated in FIG. 6, "00010111" is employed as the sync pattern which owns a reverse relationship with respect to the first-mentioned sync pattern shown in FIG. 5. It should be noted that "SYNC" corresponds to a unique pattern out of a rule, which does not appear in the modulation.

In the data bit (Data Bits) of the address data (ADIP data), "0" is biphase-modulated to thereby be converted into channel bits (Channel Bits) of "11" (namely, when preceding channel bit is "0"), or "00" (namely, when preceding channel bit is "1"). Then, "1" is biphase-modulated to thereby be converted into channel bits of "10" (namely, when preceding channel bit is "0"), or "01" (namely, when preceding channel bit is "1"). A decision for making how to convert the data bit into any one of these two patterns depends upon the preceding code. In other words, a waveform "Wave Form" shown in FIG. 5 and FIG. 6 indicates such that the pattern of the channel bit "1" corresponds to a high-level signal, and the pattern of the channel bit "0" corresponds to a low-level signal. A selection is made of any one of these two patterns in order that this waveform becomes continuous.

Figure 7:
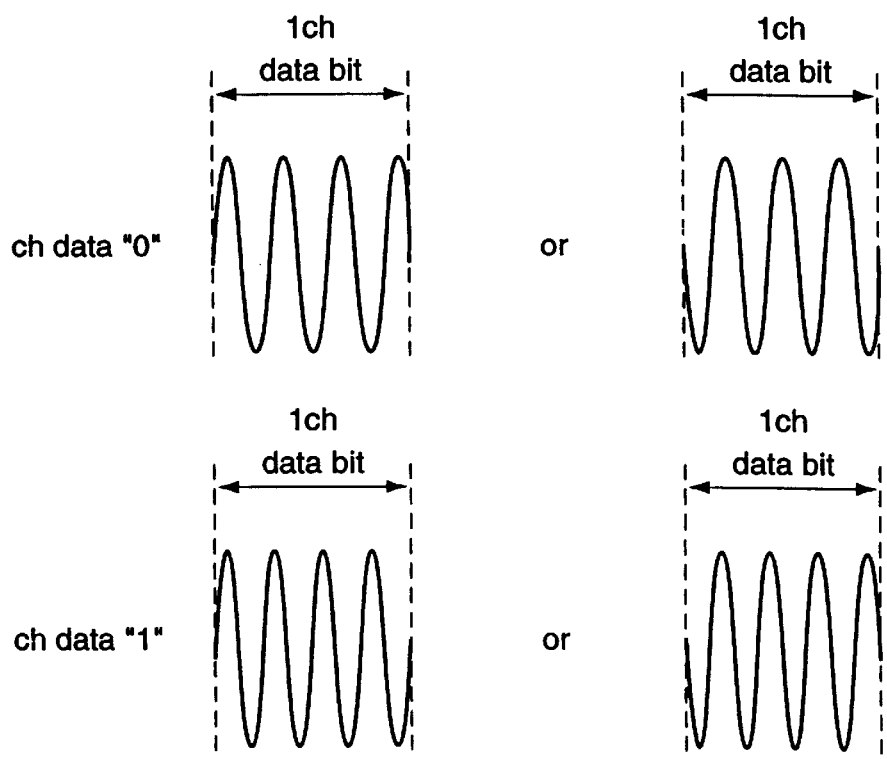
FIG. 7 is an explanatory diagram for explaining a frequency modulation executed by an FM modulating circuit 15 of FIG. 4.

In response to the biphase signal shown in FIG. 5 and FIG. 6, the FM modulating circuit 15 frequency-modulating the carrier supplied from the dividing circuit 14 in such a manner shown in FIG. 7.

That is, when the channel bit data (biphase signal) is "0", the FM modulating circuit 15 outputs a carrier of 3.5 waves during a time period corresponding to a half length of 1 data bit. It should be understood that this carrier of 3.5 waves is commenced from either a positive half wave or a negative half wave.

To the contrary, when the channel bit data (biphase signal) is "1", the FM modulating circuit 15 outputs another carrier of 4 waves during a time period corresponding to a half length of 1 data bit. It should also be understood that this carrier of 4 waves is commenced from a positive half wave or a negative half wave.

Accordingly, when the channel data bit "00" corresponding to the data "0" is inputted, the FM modulating circuit 15 outputs a frequency modulation wave of 7 waves (=3.5+3.5 waves) during a time period corresponding to a length of the data bit. When the channel bit 11 is inputted, the FM modulating circuit 15 outputs a frequency modulation wave of 8 waves (=4+4 waves). Also, when the channel data FM modulating circuit 15 outputs a frequency modulation wave of 7.5 waves (=4+3.5=3.5+4 waves).

Since the carrier having the frequency of 57.6 kHz inputted into the FM modulating circuit 15 corresponds to the 7.5 waves, the FM modulating circuit produces this carrier of 7.5 waves, or such a frequency modulation wave of 7 waves or 8 waves which is produced by shifting the carrier of 7. waves by ±6.67% (=0.5/7.5) in response to the data.

As previously explained, a selection is made of the carrier starting from the positive half wave, or the carrier starting from the negative half wave, which corresponds to the channel data 0 or the channel 1, respectively, and is continued to the preceding signal.

Figure 8:
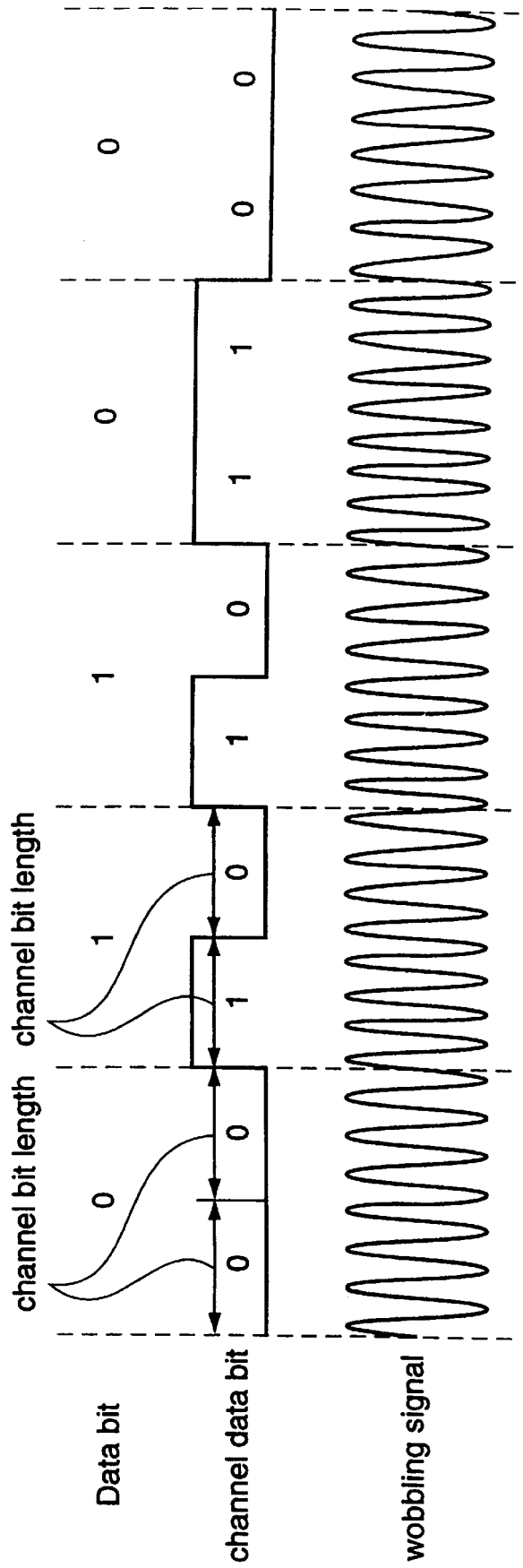
FIG. 8 schematically represents a frequency modulated signal outputted from the FM modulating circuit 15 of FIG. 4.

FIG. 8 represents an example of the frequency modulation wave outputted from the FM modulating circuit 15. In this example, it is assumed that the first data bit is "0", and the channel data bit thereof is "00". With respect to the first channel data bit "0", such a carrier of 3.5 waves that a positive half wave is commenced from a starting point is selected. As a result, an end point of this carrier is terminated by a positive half wave. Accordingly, with respect to the next channel data bit, such a carrier of 3.5 waves that a negative half wave is commenced is selected. As to the data bit "0", the frequency modulation wave of 7 waves in total is outputted.

A data bit 1 (channel bit 10) is continued to this data bit "0". Since the carrier of 3.5 waves of the channel data bit corresponding to the preceding data bit 0 is terminated at a negative half wave, a carrier such that this carrier is commenced from a positive half wave is selected as the carrier of 4 waves of the first channel data bit "1" corresponding to the data bit 1. Since the 4 waves of this channel data bit 1 is terminated at the negative half wave, as the 4 waves of the next channel data bit "0", such a carrier that this carrier is commenced from a positive half wave is selected.

Similar to the above-described manner, carriers of 7.5 waves, 8 waves, and 7 waves are produced and outputted in such a manner that these carriers are continued at boundary portions (starting points and end points) of the data bits in correspondence with data bit "1" (namely, channel data bit 10), data bit "0" (namely, channel data bit 11), and data bit "0" (namely, channel data bit 00).

As indicated in FIG. 8, in this embodiment, in any cases of the carrier of 7 waves, the carrier of 7.5 waves, and the carrier of 8 waves, the length of the channel bit is selected to be equal to a length defined by multiplying the wavelength of the carrier by an integer of ½. In other words, the channel bit length is equal to a length defined by multiplying a ½ length of carrier (frequency modulation wave) of 7 waves by 7, and also is equal to a length defined by multiplying a ½ length of carrier (frequency modulation wave) of 8 waves by 8. Then, the channel bit length is equal to a length defined by multiplying a ½ length of carrier of 7.5 waves by 7 (when channel bit is 0), or by 8 (when channel bit is 1).

Furthermore, in this embodiment, the boundary portion (starting point, or end point) of the biphase-modulated channel bit is set to become a zero cross point of a frequency modulation wave. As a result, the phase of the address data (channel bit data) is coincident with the phase of the frequency modulation wave, the boundary portion of this bit can be easily discriminated. Thus, it is possible to prevent the address data bit is erroneously detected. As a consequence, the address information can be precisely and easily reproduced.

Also, in this embodiment, a boundary portion (starting point and end point) of a data bit corresponds to an edge (zero cross point) of a frequency modulation wave. As a consequence, a clock may be produced while using the edge of the frequency modulation wave as a reference. It should be noted that as will be discussed later with reference to FIG. 10, the clock is produced while using a clock sync mark as a reference in this embodiment.

Figure 9:
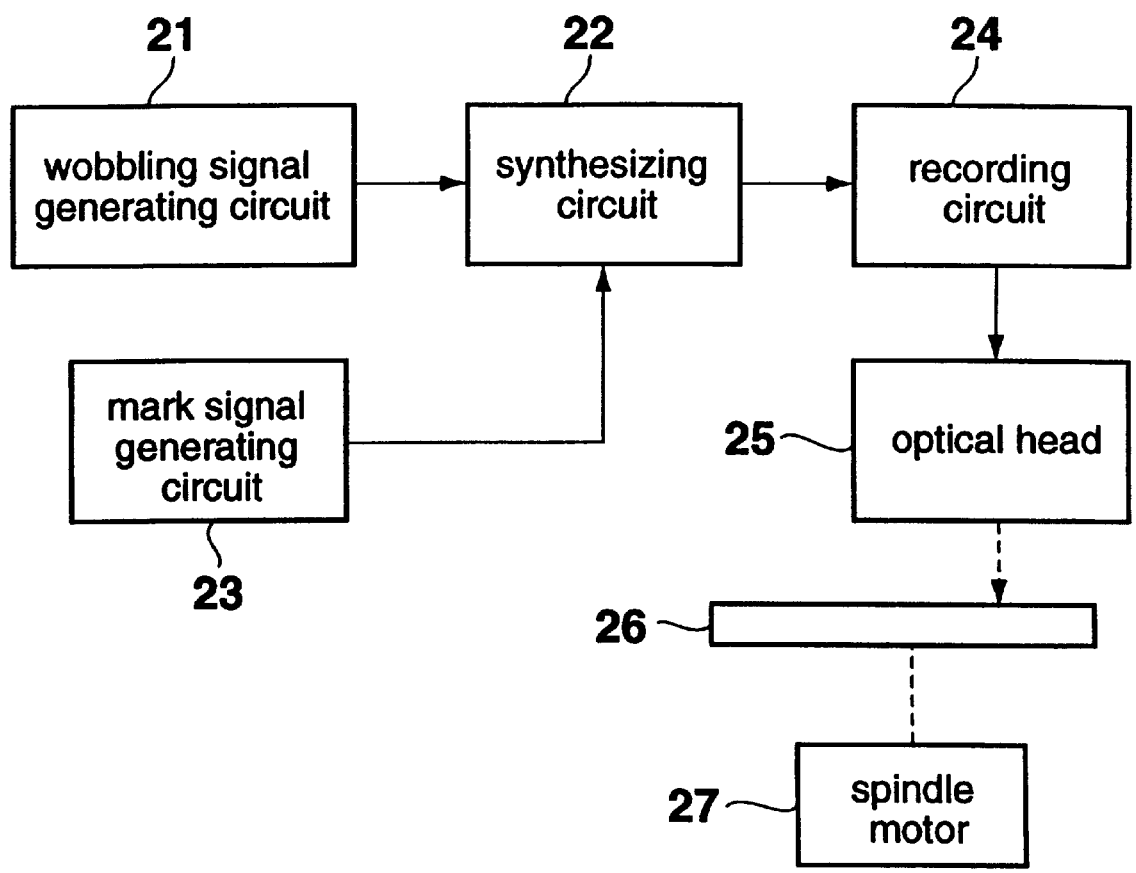
FIG. 9 is a schematic block diagram for showing an internal arrangement of a recording apparatus for manufacturing disk 1 having a pregroove.

FIG. 9 indicates an example of an internal arrangement of a recording apparatus used to manufacture a disk 1 having a pregroove (namely, disk forming apparatus). The wobbling signal generating circuit 21 owns the arrangement as previously explained with reference to FIG. 4, and supplies the frequency modulation signal outputted from the FM modulating circuit 15 to a synthesizing circuit 22. A mark signal generating circuit 23 generates a clock sync mark signal at predetermined timing, and then outputs this clock sync mark signal to the synthesizing circuit 22. The synthesizing circuit 22 synthesizes the frequency modulation signal outputted from the wobbling signal generating circuit 21 with the clock sync mark signal outputted from the mark signal generating circuit 23, and then outputs the synthesized signal to a recording circuit 24.

Figure 10:
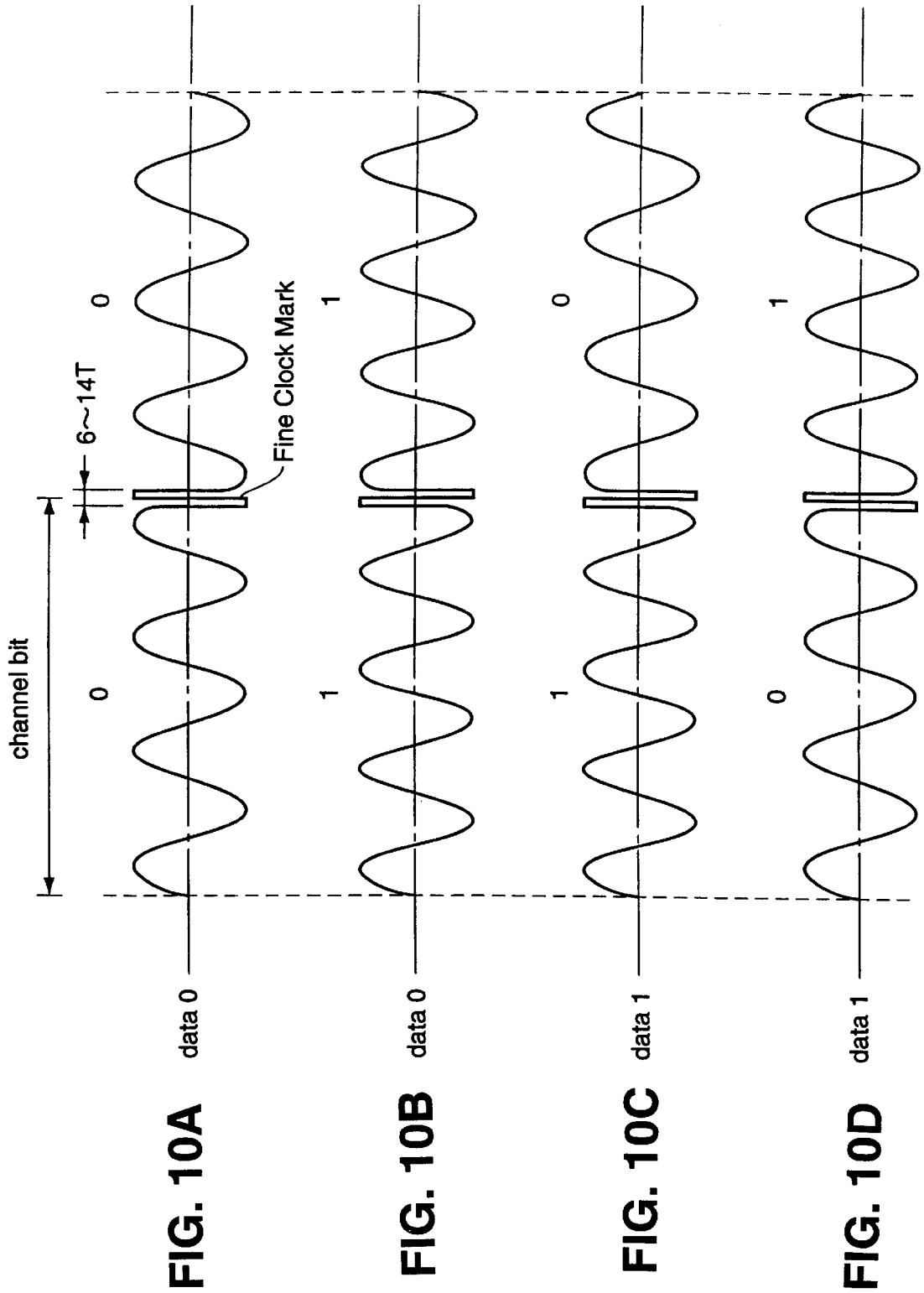
FIG. 10A through FIG. 10D are explanatory diagrams for explaining operations of a synthesizing circuit 22.

Upon supply of the clock sync mark signal, the synthesizing circuit 22 synthesizes a clock sync mark thereof (Fine Clock Mark) with the carrier supplied from the wobbling signal generating circuit 21 as shown in FIG. 10. In such a case that recording/reproducing data is modulated by the EFM (eight-to-fourteen modulation) such as DVD, a length of the clock sync mark is equal to a length of 6 to 14 T (symbol "T" indicates length of bit call).

In other words, as indicated in FIG. 10A to FIG. 10D, when the channel bit data is equal to "00" (data 0), "11" (data 0), "10" (data 1), or "01" (data 1), such a clock sync mark having a frequency higher than the modulation frequency (57.6 kHz) of the address information is synthesized with the carrier at a zero cross point of a carrier of each data center (switching point of channel bit). This clock sync mark is recorded every data bit, or every time a preselected number of data bits is inputted.

As described above, the clock sync mark (Fine Clock Mark) is inserted into the zero cross point of the wobbling frequency modulation wave corresponding to a center of an address data bit (switching point of channel data bit), so that there is a small amplitude variation in the clock sync mark, and this amplitude variation can be easily detected.

That is to say, in such a case that when the channel data bit becomes 0, the carrier is frequency-modulated in the FM modulating circuit 15 in such a manner that, for example, the frequency of this carrier is shifted by −5% from the center frequency, and when the channel data bit becomes 1, the carrier is frequency-modulated in the FM modulating circuit 15 in such a manner that, for instance, the frequency of this carrier is shifted by +5% from the center frequency, the boundary portion of the data bit, or the channel data bit is not coincident with the zero cross point of the frequency modulation wave. As a result, the channel data bit (otherwise, data bit) may be easily, erroneously detected. Also, the insertion position of the clock sync mark does not necessarily constitute the zero cross point, but is superimposed on a point having a predetermined amplitude value of the frequency modulation wave. As a result, the level of the clock sync mark is increased, or decreased only by the amplitude value thereof, and therefore, this level can be hardly detected. In accordance with this embodiment, since the clock sync mark is always arranged at the zero cross point of the frequency modulation wave, this clock sync mark can be readily detected (can be readily discriminated from the frequency modulation wave).

The recording circuit 24 controls an optical head 25 in response to the signal supplied from the synthesizing circuit 22 to thereby produce laser light used to form a pregroove (containing a clock sync mark) in a mother disk 26. A spindle motor 27 rotates the mother disk 26 in a constant angular velocity (CAV).

That is, the frequency modulation signal generated from the wobbling signal generating circuit 21 is synthesized with the clock sync mark signal outputted from the mark signal generating circuit 23 in the synthesizing circuit 22, and the synthesized signal is entered into the recording circuit 24. The recording circuit 24 controls the optical head 25 in response to the signal inputted from the synthesizing circuit 22 to thereby produce the laser light. The laser light generated from the optical head 25 is irradiated to the mother disk 26 rotated by the spindle motor 27 in the constant angular velocity.

The mother disk 26 is developed, and then a stamper is formed from this developed mother disk 26, and thereafter, a large number of replicas are formed as the disk 1 from this stamper. As a result, as previously explained, the disk 1 in which the pregroove 2 having the above-mentioned clock sync marks has been made is manufactured.

Figure 11:
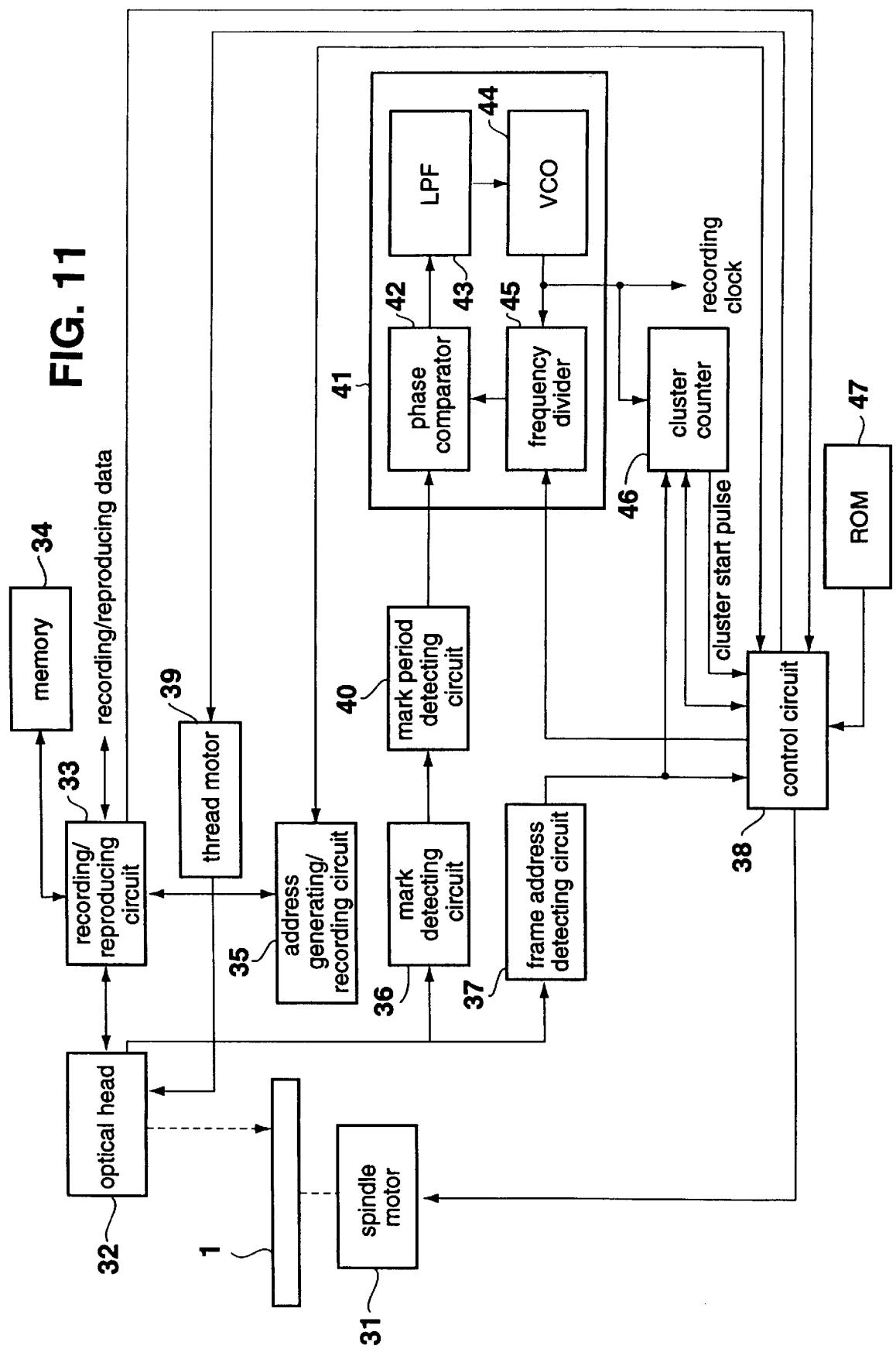
FIG. 11 is a schematic block diagram for indicating an internal arrangement of an optical disk recording/reproducing apparatus to which a recording/reproducing apparatus of the present invention is applied.

FIG. 11 indicates an example of an internal arrangement of an optical disk recording/reproducing apparatus for recording/reproducing data with respect to the disk 1 manufactured in the above-described manner. A spindle motor 31 is designed to rotate the disk 1 in the constant angular velocity (CAV). An optical head 32 irradiates laser light onto the disk 1 so as to record the data on the disk 1 and reproduce data from light reflected from the optical disk 1. A recording/reproducing circuit 33 reads data for 1 cluster when recording data entered from an apparatus (not shown) is temporarily stored in a memory 4, and the data in recording unit of 1 cluster (otherwise, data for 1 sector) are stored in this memory 34. Then, the recording/reproducing circuit 33 modulates the read data in accordance with a preselected modulation system to output the modulated data to the optical head 32. Also, the recording/reproducing circuit 33 demodulates the data entered from the optical head 32 in a proper manner to output the demodulated data to another apparatus (not shown either).

An address generating/reading circuit 35 generates a data address (sector address) (see FIG. 14) to be recorded on a track (within pregroove 2) under control by a control circuit 38, and then outputs the data address to the recording/reproducing circuit 33. The recording/reproducing circuit 33 adds this data address to the recording data supplied from the apparatus (not shown), and then outputs the added data to the optical head 32. When the address data is contained in the data reproduced from the track of the disk 1 by the optical head 32, the recording/reproducing circuit 33 separates this address data from the reproduced data, and then outputs this separated address data to the address generating/ reading circuit 35. The address generating/reading circuit 35 outputs the read address to the control circuit 38.

A mark detecting circuit 36 detects a component corresponding to the clock sync mark from an RF signal reproduced/outputted by/from the optical head 32. A frame address detecting circuit 37 reads the address information (track number and frame number of FIG. 3) contained in the wobbling signal out from the RF signal outputted from the optical head 32, and then supplies the read address information to a cluster counter 46 and the control circuit 38.

A mark period detecting circuit 40 judges a periodical characteristic of a detection pulse which is derived when the mark detecting circuit 36 detects the clock sync mark. In other words, since the clock sync mark is generated in a constant time period, the mark period detecting circuit 40 judges as to whether or not the detection pulse inputted from the mark detecting circuit 36 is equal to this detection pulse generated in a constant time period. If this detection pulse is equal to the detection pulse generated in a constant time period, then the mark period detecting circuit 40 generates another pulse synchronized with this detection pulse and then supplies this generated pulse to a phase comparator 42 of a PLL circuit 41 provided in a post stage. When the detection pulse is entered in a constant time period, the mark period detesting circuit 40 generates a quasi-pulse at preselected timing in order that the PLL circuit 41 provided at the post stage is not locked to the erroneous phase.

The PLL circuit 41 includes a low-pass filter (LPF) 43, a voltage controlled oscillator (VCO) 44, and a frequency divider 45 in addition to the phase comparator 42. The phase comparator 42 compares the input from the mark period detecting circuit 40 with the input from the frequency divider 45 to output a phase error. The low-pass filter 43 filters the phase error signal derived from the phase comparator 42 to output the filtered phase signal to the VCO 44. The VCO 44 produces a clock of a phase corresponding to the output from the low-pass filter 43 to thereby output this clock to the frequency divider 45. The frequency divider 45 frequency-divides the clock entered from the VCO 44 based on a predetermined values (a value designated by the control circuit 38), and then outputs the frequency-divided result of the phase comparator 42.

The clock outputted from the VCO 44 is supplied to the respective circuits, and also to a cluster counter 46. The cluster counter 46 counts the number of clocks outputted from the VCO 44 on the basis of the frame address supplied from the frame address detecting circuit 37. When the count value reaches a preset value (namely, value corresponding to a length of one cluster), the cluster counter 46 produces a cluster start pulse and supplies this cluster start pulse to the control circuit 38.

A thread motor 39 transports the optical head 32 to a predetermined track position of the disk 1 under control of the control circuit 38. The control circuit 38 controls the spindle motor 31 so as to rotate the disk 1 in a constant angular velocity (CAV).

In a ROM 47, a table is stored which may define a correspondence relationship between the track number (see FIG. 3) in the address frame and a zone for segmenting a data recording region of the disk 1.

Figure 12:
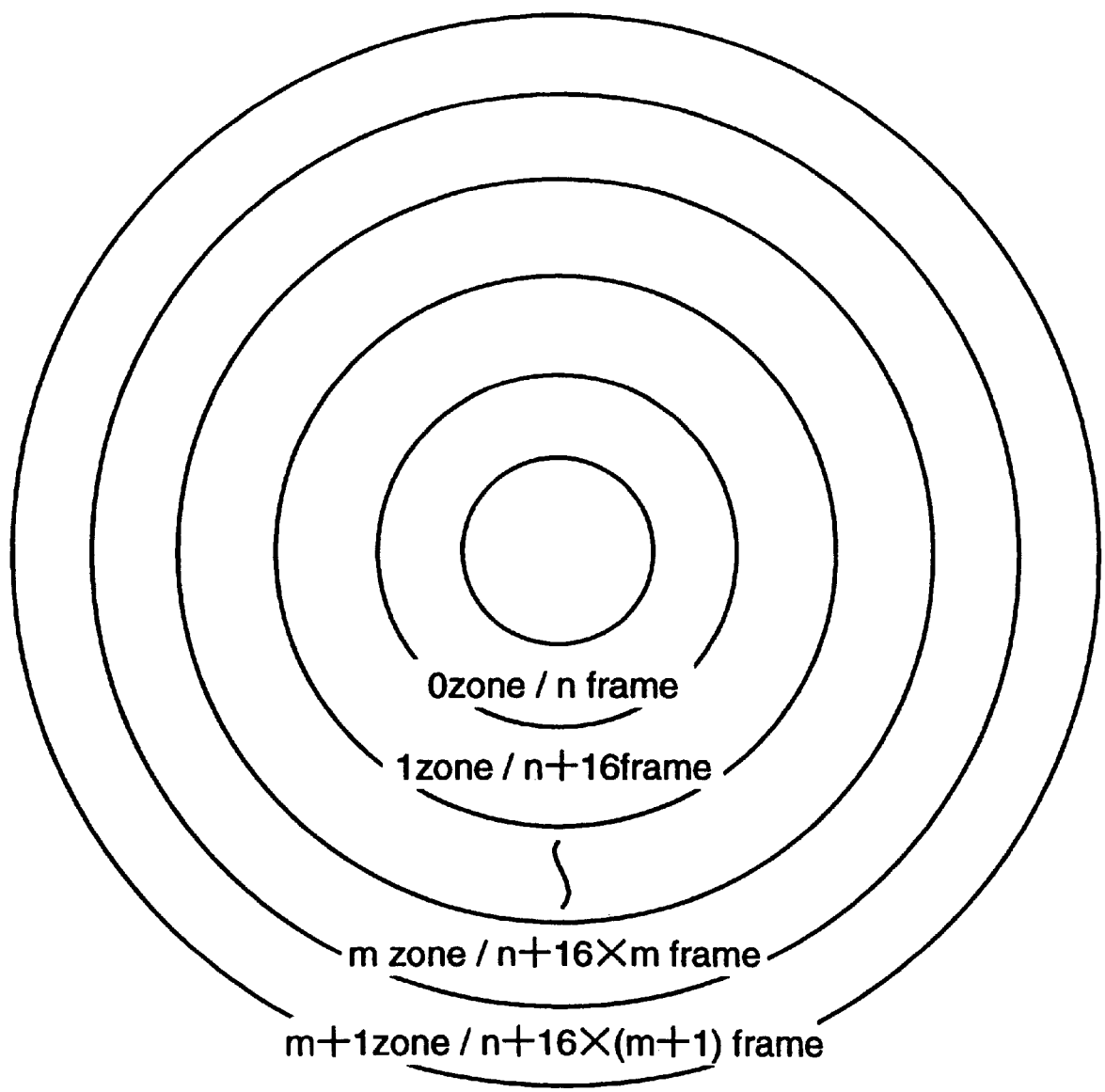
FIG. 12 is an explanatory diagram for explaining zones defined in a disk.

In other words, as indicated in FIG. 12, the control circuit 38 segments the disk 1 into a plurality of zones ((m +2) pieces of zones from the 0-th zone to the (m+1)th zone in this embodiment), and records/reproduces the data with respect to the segmented zones. Assuming now that the number (quantity) of data frames per 1 track in the 0-th zone is "n" (this data frame is different from the address frame as explained with reference to FIG. 3, but corresponds to the unit of data block), the data frame number per 1 track in the subsequent first zone is equal to "n+16". Similarly, in one zone on the outer circumferential side, the data frame number thereof is increased by 16, as compared with the adjoining zone on the inter circumferential side. In the (m+1)th zone, i.e., the outermost circumferential zone, the total data frame number becomes n+16×(m+1).

The 0-th zone is switched into the first zone with the same line density as the line density of the innermost circumference of the 0-th zone (zeroth zone) from a radial position where a capacity of (n+16) frames is obtained. Similarly, in the m-th zone, it is set to the m-th zone from a radial position where a capacity of (n+16×m) frames is obtained with the same line density as the line density of the innermost circumference in the 0-th zone.

For instance, assuming now that a radial range of the disk 1 from 24 mm to 58 mm is defined as a recording/ reproducing area, a track pitch of this disk 1 is 0.87 $\mu$m, and the line density is 0.38 $\mu$m/bit, the recording/reproducing area is segmented into 48 pieces of zones. In the 0-th zone whose disk radial is 24 mm, the frame density becomes 528 frames per 1 track. When the zone is incremented by 1, 16 frames per 1 track are increased.

As will be described later, in this embodiment, since one sector is constructed of 24 frames (data frames), the number (=16) of frames incremented every zone is set to be a smaller value than the number (=24) of frames for constituting this one sector. As a consequence, it is possible to constitute a large number of zones in more fine unit, and thus, the capacity of the disk 1 can be increased.

Subsequently, operations of the optical disk recording/ reproducing apparatus shown in FIG. 11 will now be described. In this case, operations when data is recorded are explained. The optical head 32 irradiates the laser light onto the optical disk 1, and outputs the RF signal obtained from the reflection light of the optical disk 1. The frame address detecting circuit 37 reads out the wobbling information (address information) from this RF signal, and then outputs this read wobbling information to the control circuit 38 and also to the cluster counter 46. Also, this read wobbling information is supplied to the mark detecting circuit 36 from which the clock sync mark is detected. Then, this clock sync mark is supplied to the mark period detecting circuit 40.

The mark period detecting circuit 40 judges the periodical characteristic of the clock sync mark, and produces a predetermined pulse in accordance with the judgment result, which will then be supplied to the PLL circuit 41. The PLL circuit 41 produces the clock (recording clock) in synchronism with this pulse, and supplies this recording clock to the cluster counter 46.

The control circuit 38, can detect the position of the reference clock sync mark in 1 track (1 rotation) from the frame address (frame number) supplied from the frame address detecting circuit 37. While the clock sync mark is used as a reference, which is detected from, for example, a frame of a frame number 0 (address frame), the control circuit 38 can access to an arbitrary position on the track based on the count value of the recording clock.

Figure 13:
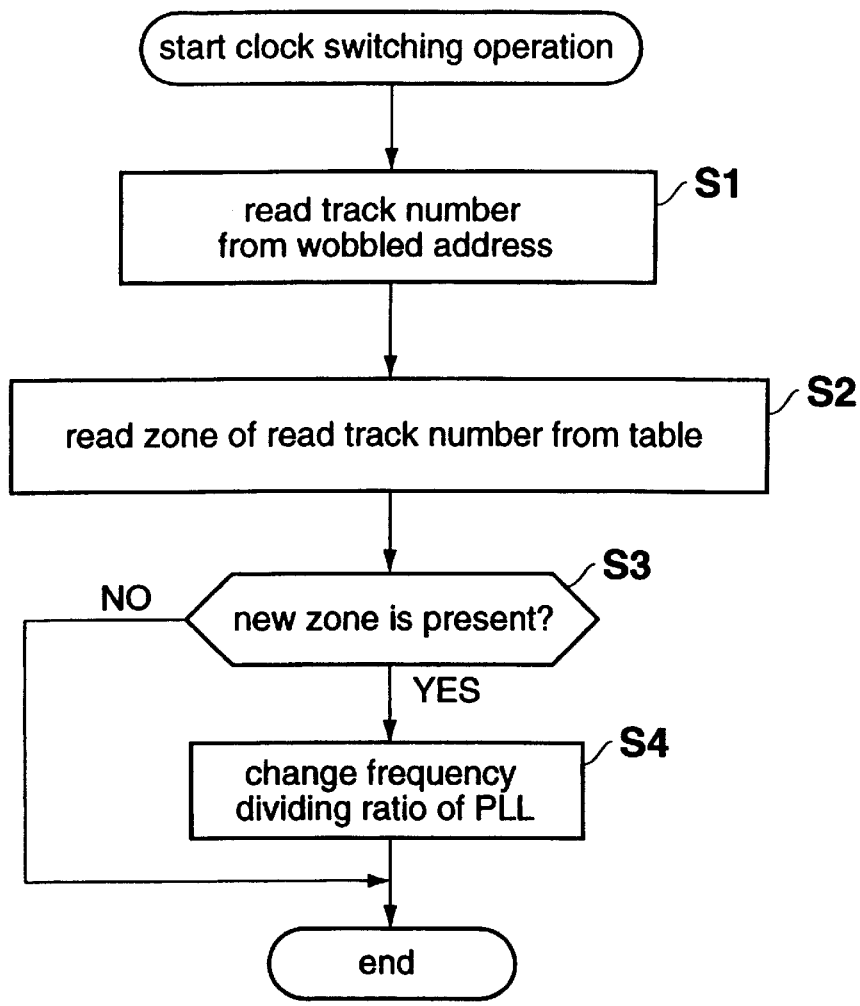
FIG. 13 is a flow chart for describing a clock switching process operation performed in the optical disk recording/reproducing apparatus shown in FIG. 11.

When the control circuit 38 accesses to an arbitrary position on the track in the above-described manner, the control circuit 38 is further required to make such a judgment that which zone, this access point belongs to. Also, the control circuit 38 must control the VCO 44 to produce the clock having the frequency corresponding to this zone. Accordingly, the control circuit 38 furthermore executes a clock switching process operation described in a flow chart of FIG. 13.

At a first step S1 of this flow chart, the control circuit 38 reads out the track number from the frame address of the access point outputted by the frame address detecting circuit 37. Then, at a step S2, the zone corresponding to the track number read at the step S1 is read from the table stored in the ROM 47. As previously explained, the table of the ROM 47 previously stores such a corresponding relationship, i.e., the tracks having the respective numbers belong to any of the zones from the 0-th zone to the (m+1)th zone.

Therefore, at a step S3, a judgment is made as to whether or not the presently read track number belongs to a new zone different from the so far accessed zone. When it is so judged that this presently read track number belongs to the new zone, the clock switching process operation is advanced to a step S4. At this step S4, the control circuit 38 controls the frequency divider 45 to set a frequency dividing rate therein, which corresponds to this new zone. As a consequence, the recording clocks having the different frequencies from each other with respect to each of these zones are outputted from the VCO 44.

To the contrary, when it is judged at the step S3 that the present zone is not equal to the new zone, the process at the step S4 is skipped. In other words, the frequency dividing rate of the frequency divider 45 is not changed, but is kept.

Figure 14:
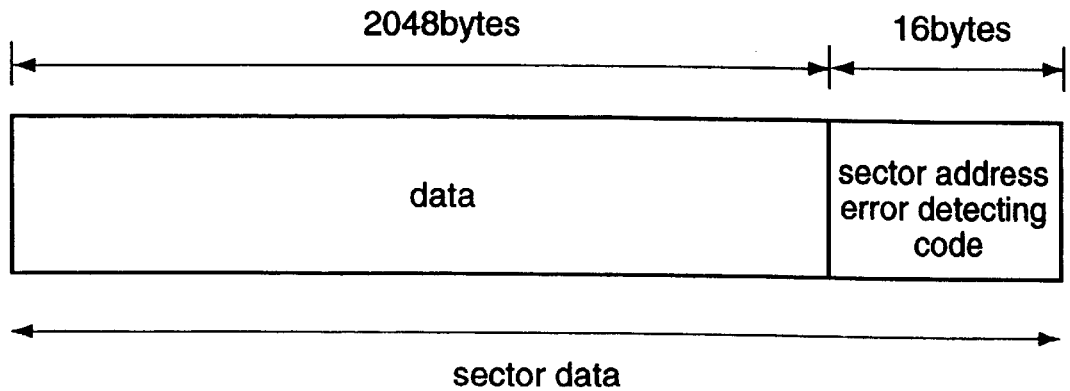
FIG. 14 is an explanatory diagram for explaining a data format with respect to 1 sector.

Next, a format of recording data will now be explained. As previously described, data is recorded in unit of 1 cluster (32 Kbytes) in this embodiment. This cluster is arranged as follows:

In other words, as shown in FIG. 14, 2 Kbytes (2048 bytes)-data is extracted as data for 1 sector, and 16-byte overhead is added to this extracted 2 Kbyte-data. This overhead contains a sector address (namely, address generated, or read by address generating/reading circuit 35 of FIG. 11), and an error detecting code for detecting an error, and so on.

Figure 15:
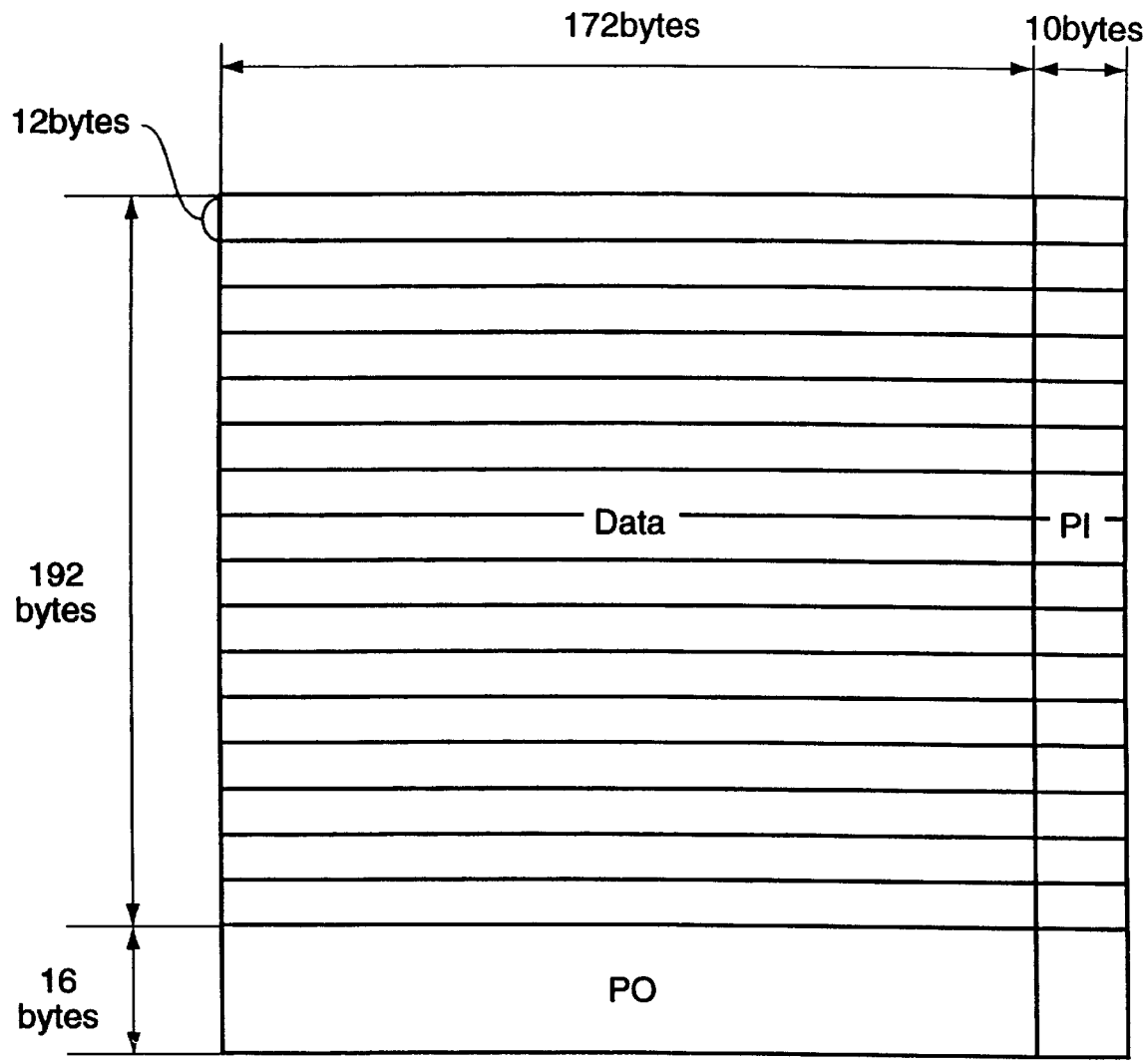
FIG. 15 is an explanatory diagram for explaining a structure of 32 Kbytes data.

As represented in FIG. 15, this 2064 byte-data (i.e., =2048 bytes+16 bytes) is set as 12×172 (=2064) byte-data. Then, 16 pieces of data for 1 sector are collected to constitute 192 (=12×16)×172 byte-data. To this 192×172 byte-data, a 10 byte-inner code (PI) and a 16 byte-outer code (PO) are added as a parity with respect to each byte along the lateral direction and the longitudinal direction.

Furthermore, among the 208 (=192+16)×182 (=172+10) byte-data blocked in the above-described manner, each of the 16×182 byte-outer codes (PO) is added to 16 pieces of 12×182 byte-sector data (numbered from "0" to "15"), and interleaved. The blocked data is segmented into 16 pieces of 1×182 byte-data. Then, 13 (=12+1)×182 byte-data corresponding to data for 1 sector.

Figure 16:
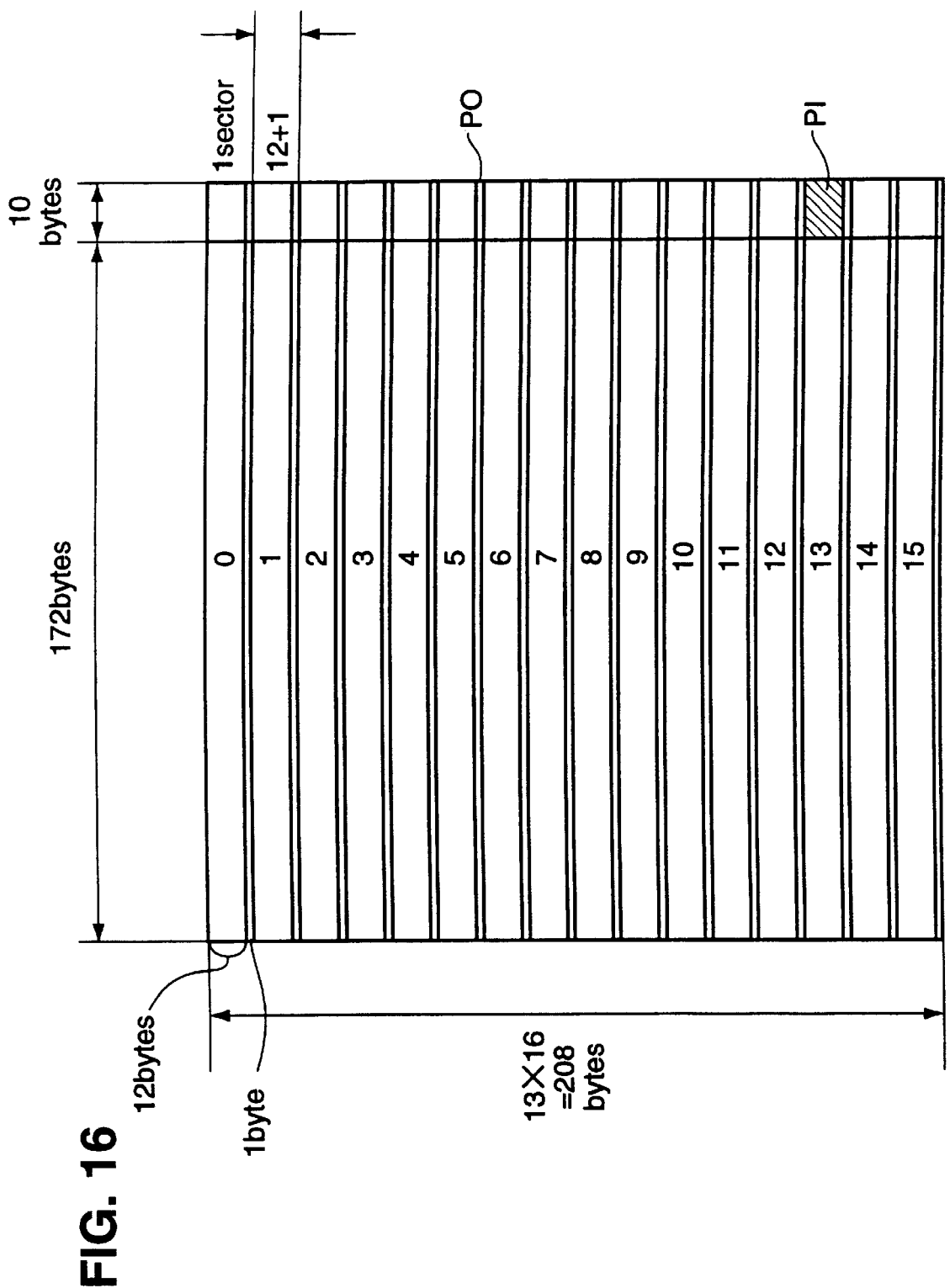
FIG. 16 is an explanatory diagram for explaining such a condition that the outer code of FIG. 15 is interleaved.
Figure 17:
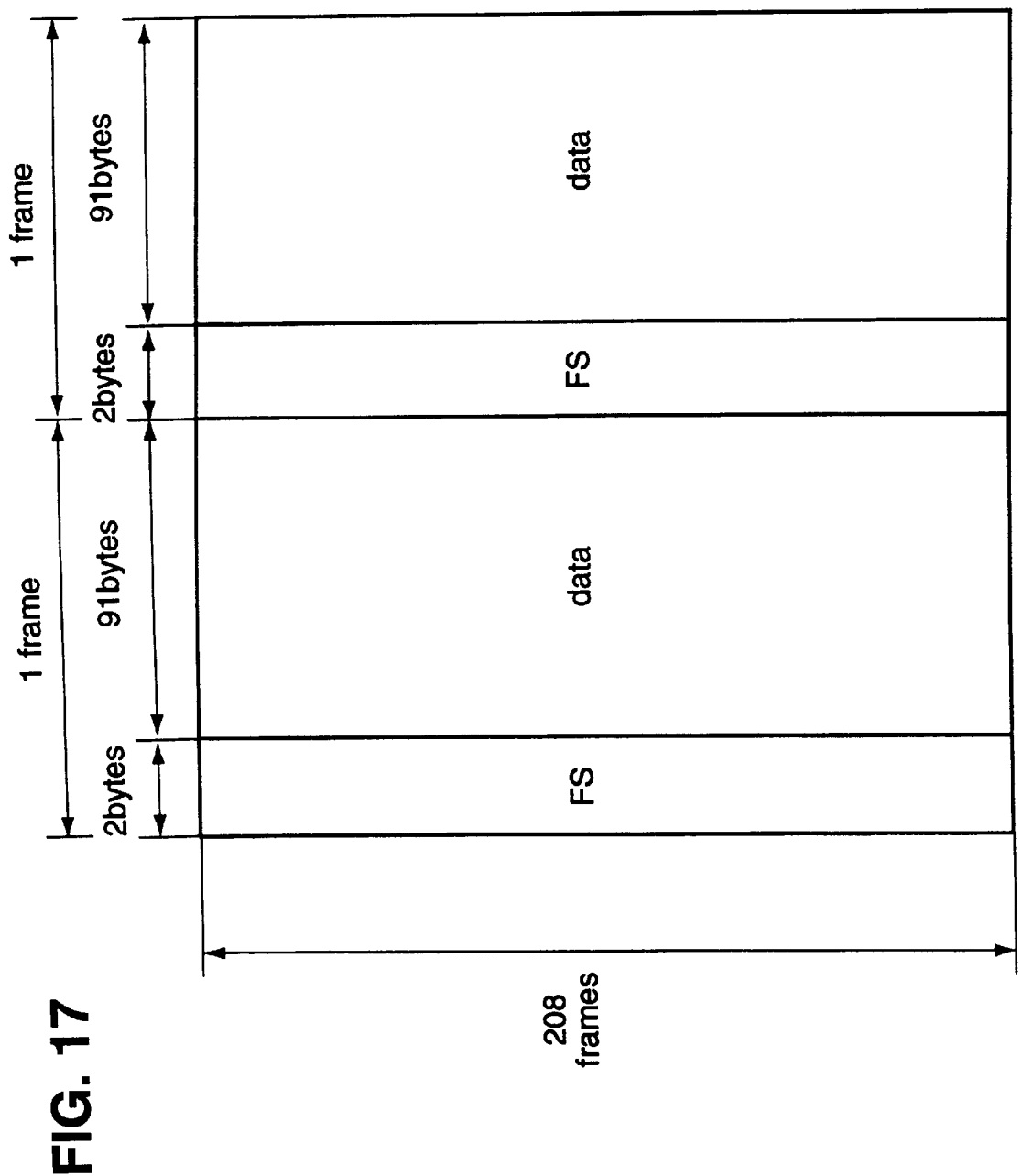
FIG. 17 is an explanatory diagram for explaining a structure of 32 Kbytes block data.

In addition, the 208×182 byte-data indicated in FIG. 16 is subdivided into two data along the longitudinal direction. 1 frame is constituted by 91 byte-data, as shown in FIG. 17. The 208×182 byte-data is set as (208×2 frame) data. A 2 byte-frame sync signal (FS) is further added to a head of the 91 byte-frame data. As a result, as shown in FIG. 17, the data for 1 frame becomes 93 byte-data in total, namely 208 (93×2) byte-block data. This block data constitutes data for 1 cluster. A size of a real data portion excluding an overhead portion thereof becomes 32 kbytes (=2048×16/1024 Kbytes).

In other words, 1 cluster is constructed of 16 sectors, and 1 sector is constituted by 24 frames.

These data are recorded on the disk 1 in unit of cluster. In this recording operation, as illustrated in FIG. 18, the control circuit 38 arranges a link area between one cluster and the subsequent cluster.

Figure 18:
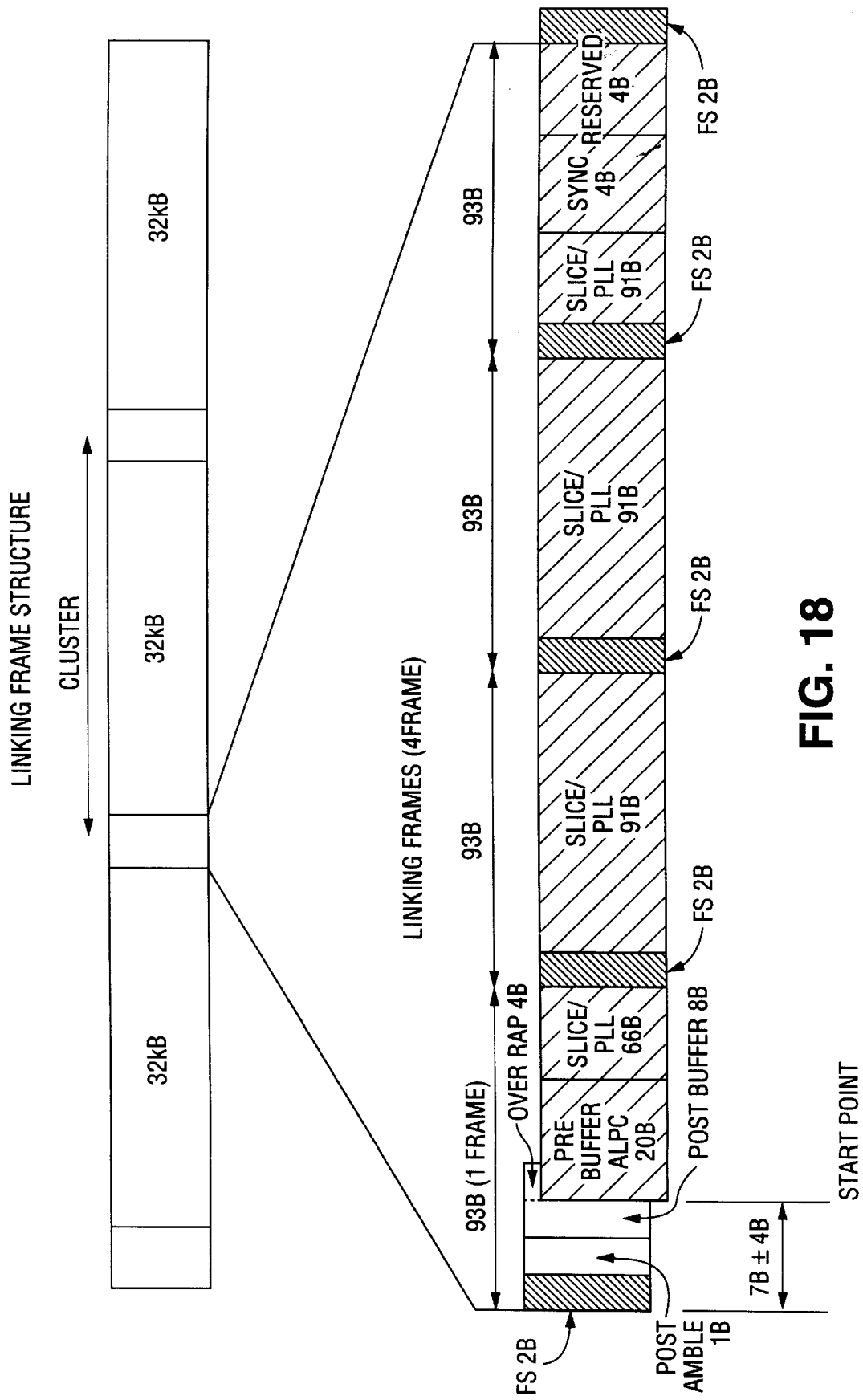
FIG. 18 schematically illustrates a structural example of a link area.

As shown in FIG. 18, the link area is arranged by four frames data frames). Similar to the case of the data area contained in cluster), 1 frame data is constructed of 93 bytes. A 2 byte-frame sync signal (FS=Frame Sync) is arranged at a head of each frame.

In the link area, 86 byte data and 3-frame data are added in front of 32 Kbyte-data block (cluster) to be recorded. The 20 byte-head data among the 86 byte-data is used as a prebuffer (Prebuffer) and an ALPC (Automatic Laser Power Control). The prebuffer is such a buffer for absorbing a positional shift about a starting position of a cluster caused by jitter. The ALPC corresponds to an area for setting record power, into which data used to set laser light power during the reading operation, or the reproducing operation to a preselected value is stored.

Slice/PLL are arranged in the subsequent 66 byte-area. The Slice is such data for setting a time constant used to process reproducing data to obtain binary data, and the PLL is such data for reproducing a clock.

Slice/PLL are arranged in each of the subsequent 2 frames. In a final 1 frame, Slice/PLL are arranged in an 83 byte-head area, a sync signal (Sync) is arranged in the next 4 byte-area, and a last 4 byte-area is reserved for a future use (Reserve).

After the 32 Kbyte (cluster)-data block, a 2 byte-frame sync signal, a 1 byte-postamble (Postamble), and a 8 byte-postbuffer (Postbuffer) are formed. In the postamble, such data is recorded which controls the mark length of the final data to return the signal polarity. The postbuffer corresponds to a buffer area for absorbing the jitter caused by eccentricity. In case of such a ideal case that there is completely no jitter, the 4 byte postbuffers among the 8 byte postbuffer are overlapped, and the prebuffer and the ALPC of the next cluster are recorded.

This link area is applied to a ROM disk, so that both the ROM disk and the RAM disk may be formed with a common format. In this alternative case, in the ROM disk, information may be recorded in the postbuffer, the prebuffer, and the ALPC of the link area. For example, an address is entered, so that the address information probability may by increased.

It should be noted that the lengths (byte numbers) of the respective regions described in the above-described embodiment are merely exemplified, and therefore may be selected to be proper values.

Alternatively, the present invention may be applied to other cases, for instance, data may be recorded, or reproduced on/from disks other than an optical disk.

What is claimed is:

1. A disk to which sectors and clusters of data are written, wherein each of the sectors is constituted by one arbitrary integer (F) of data frames, and each of the clusters is constituted by an arbitrary integer (S) of said sectors, wherein the disk includes:

a region for recording said data, wherein said region is segmented into a plurality of zones, a first set of at least one of the zones is located adjacent to a second set of at least one of the zones, the second set is located closer to an outer circumferential side of the disk than is the first set, each track of the first set is segmented into N data frames, where N is a number, and each track of the second set is segmented into M data frames, where M is a number equal to N+K, and wherein K is an integer smaller than said integer (F).

2. A recording/reproducing apparatus for recording/reproducing sectors and clusters of data on/from a disk having a recording region segmented into zones and tracks having track numbers, each of the zones comprising at least one track having a track number, wherein each of the sectors is constituted by one arbitrary integer (F) of data frames, and each of the clusters is constituted by an arbitrary integer (S) of said sectors, said apparatus comprising:

reading means for reading the track number of an access point of said disk;

storing means for storing a table about said track numbers and about said zones, wherein the table indicates that a first set of at least one of the zones is located adjacent to a second set of at least one of the zones, the second set is located closer to an outer circumferential side of the disk than is the first set, each track of the first set is segmented into N data frames, where N is a number, and each track of the second set is segmented into M data frames, where M is a number equal to N+K, and wherein K is an integer smaller than said integer (F);

judging means for judging one of the zones which includes said track number read by said reading means with reference to the table of said storing means, thereby producing a judgment result; and generating means for generating a clock having a predetermined frequency in response to said judgment result.

3. A recording/reproducing method for recording/reproducing sectors and clusters of data on/from a disk having a recording region segmented into zones and tracks having track numbers, each of the zones comprising at least one track having a track number, wherein each of the sectors is constituted by one arbitrary integer (F) of data frames, and each of the clusters is constituted by an arbitrary integer (S) of said sectors, wherein:

a track number of an access point of said disk is read;

a table about said track numbers and about said zones is stored in which the following relationship is established, wherein the table indicates that a first set of at least one of the zones is located adjacent to a second set of at least one of the zones, the second set is located closer to an outer circumferential side of the disk than is the first set, each track of the first set is segmented into N data frames, where N is a number, and each track of the second set is segmented into M data frames, where M is a number equal to N+K, and wherein K is an integer smaller than said integer (F);

one of the zones belonging to said track number is judged with reference to the table, thereby producing a judgment result; and a clock having a predetermined frequency is generated in response to the judgment result.

* * * * *